Feb. 5, 1952 H. L. POTTER 2,584,227
BEARING
Filed Dec. 1, 1945

INVENTOR.
Howell L. Potter
BY
ATTORNEYS

Patented Feb. 5, 1952

2,584,227

UNITED STATES PATENT OFFICE 2,584,227

BEARING

Howell L. Potter, New Britain, Conn., assignor to The Fafnir Bearing Company, New Britain, Conn., a corporation of Connecticut Application December 1, 1945, Serial No. 632,244

4 Claims. (Cl. 308—187.2)

My invention relates to a self-alining bearing and more particularly to improved means for limiting self-alinement thereof.

Self-alining bearings include inner and outer bearing rings with interposed anti-friction bearig members. One of the rings is provided with a spherical raceway surface for the anti-friction bearing members so that the rings may be misalined without disturbing the functions of the bearing. When seals are employed in self-alining bearings, such seals are usually carried by the ring having the spherical surface, and during extreme misalinement, for example when handling the bearing prior to installation, anti-friction bearing members often so forcibly engage the seals as to snap them out, with consequent annoyance or damage. Whether or not seals are employed, extreme misalinement will permit the anti-friction bearing members to fall out, with consequent collapse of the bearing.

It is an object of my invention to provide improved means for limiting misalinement of the rings in a self-alining bearing.

It is another object to provide means for limiting misalinement of the rings of a self-alining bearing to such an extent that the anti-friction bearing members cannot so forcibly engage a seal as to force it out.

Other objects and various features of novelty and invention will be hereinafter pointed out or will become apparent to those skilled in the art.

In the drawings which show, for illustrative purposes only, a preferred form of the invention—

Figure 1:
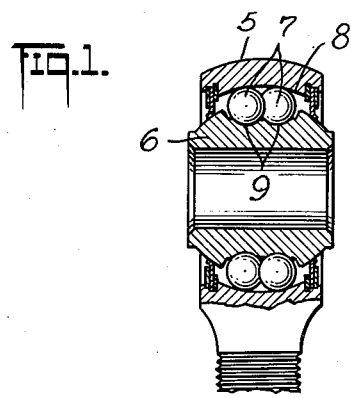
Fig. 1 is a central sectional view through a self-alining bearing embodied in a rod and fitting, but the invention is not dependent upon any particular application of the bearing as such.

The self-alining bearing includes an outer bearing ring 5, an inner bearing ring 6, with interposed anti-friction bearing members 7. One of the rings (in this case the outer ring 5) is provided with a spherical raceway surface 8, while the other ring (in this case the inner) is provided with two standard raceway grooves 9. The two raceway grooves 9 are illustrated because this particular bearing is a double row bearing. In a single row bearing, of course a single groove 9 would be provided. Self-alining bearings of the type just described are old and well-known in the art.

In order to limit misalinement of the rings 5—6, I employ abutment means carried by the ring having the spherical raceway surface. In the form illustrated the outer ring is provided with an abutment groove 10 in one edge of the bearing, and an abutment, preferably in the form of a split snap ring 11, is seated and quite securely held in the groove 10. Such snap rings are old and well-known in the art for many purposes.

The abutment ring 11 may be formed of steel or other metal and may even be formed of plastic such as Bakelite or similar material having the requisite hardness. The abutment ring 11 intersects or extends slightly beyond the spherical surface 8 to an extent preferably less than half the radius of the anti-friction bearing members, so that during misalinement of the rings the anti-friction bearing members adjacent the abutment ring will engage the latter preferably in such fashion as to wedge the abutment ring predominantly radially outwardly (when the anti-friction bearing members are balls) into its groove and the engagement between anti-friction bearing members and the abutment ring will serve to limit the misalinement of the rings. Thus, the rings cannot misaline to an extent sufficient to cause the anti-friction bearing members to fall out.

The invention, in more specific form, further contemplates the use of a seal so positioned in relation to the abutment ring 11 that the misalinement of the rings will be stopped before anti-friction bearing members can engage the seal so forcibly as to be likely to force it out of the ring.

Figure 2:
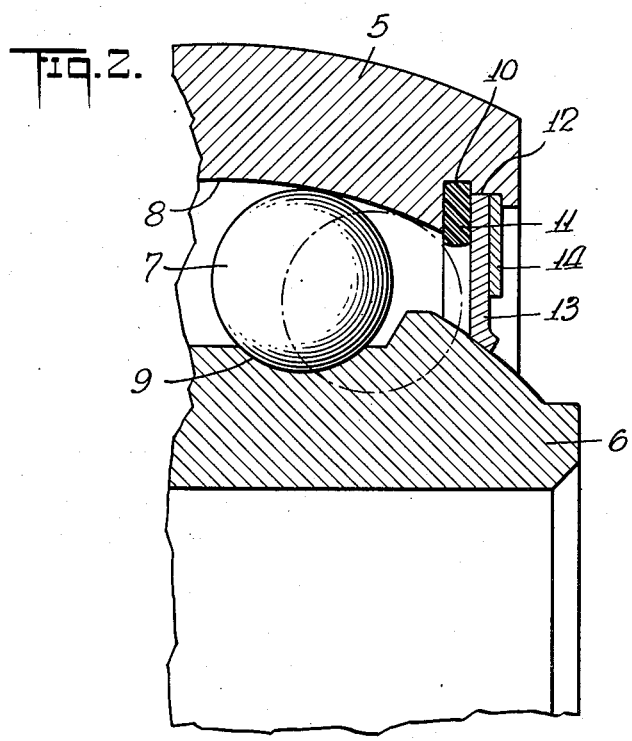
Fig. 2 is an enlarged fragmentary view of the bearing shown in Fig. 1.

In the form shown, the outer ring 5 is provided with a second groove 12 carrying a plastic or metal seal disk 13 and held in place by a snap or other type of ring 14, the seal extending across the space between the two bearing rings. The grooves 10 and 12 may be considered as parts of a single groove or groove means, and a part of the seal is seated against a part of said abutment ring. The positioning and extending of the parts as shown in Fig. 2 are such that anti-friction bearing members 7 will engage the abutment ring 11 and thus stop misalinement before the anti-friction bearing members can force the seal out. In the design illustrated, the misalinement is stopped before the anti-friction bearing members even engage the seal, but in practice the parts may be so proportioned that the anti-friction bearing members may engage the seal but should not be permitted to move far enough to so forcibly engage the seal as to force it out of the bearing ring.

When my improved means for limiting misalinement of the bearing rings is employed, seals may be removed for inspection or greasing of the bearing, without danger of having a bearing accidentally fail due to loss of anti-friction bearing members. Furthermore, self-alining bearings with my improved limiting means may be freely handled in the shop and before application and before seals are installed, all without danger of extreme misalinement.

While the invention has been described in considerable detail and a preferred form illustrated, it is to be understood that various changes may be made within the scope of the invention as defined in the appended claims.

I claim:

1. In a self-alining bearing including inner and outer bearing rings with interposed anti-friction bearing members, one of said rings having a spherical raceway surface for said anti-friction bearing members whereby said rings may be misalined, said one of said bearing rings having an annular seal groove therein, a seal mounted in said groove, said one of said rings having a second annular groove intermediate said anti-friction bearing members and said seal, an annular abutment member mounted in said second groove and positioned in the path of said anti-friction bearing members, whereby the latter may engage said abutment and prevent further misalinement before the anti-friction bearing members substantially engage said seal.

2. In a self-alining bearing including inner and outer bearing rings with interposed anti-friction bearing members, said outer bearing ring having a spherical raceway surface for said anti-friction bearing members whereby said rings may be self-alined, said outer bearing ring having an annular abutment groove therein, a snap ring mounted in said groove and projecting inwardly a slight amount so as to be engaged by anti-friction bearing members and limit misalinement of said rings, an annular seal groove in said outer bearing ring and axially outwardly of said abutment groove, and seal means carried in said second groove, for the purpose set forth.

3. In a self-alining bearing including inner and outer bearing rings with interposed antifriction bearing members, one of said rings having a spherical raceway surface for said antifriction bearing members, whereby said bearing may be self-alining, said one of said rings having the spherical raceway surface having circumferential generally radial groove means at one side, an abutment ring and seal means held in said groove means, said abutment ring projecting beyond said spherical raceway surface by an amount less than half the radius of said antifriction bearing members, whereby upon misalinement of said rings the antifriction bearing members will engage said projecting abutment ring to positively limit the misalinement and the force transmitted to said abutment ring will urge the latter predominantly radially, said seal means extending across the space between said bearing rings and before axially outwardly of the point of engagement between said abutment ring and said antifriction bearing members, whereby misalinement of said bearing rings will be positively limited before the antifriction bearing members can very forcibly engage said seal means and force the same out of said groove means.

4. In the combination defined in claim 3, at least a part of said seal means being seated against a part of said abutment ring.

HOWELL L. POTTER.

REFERENCES CITED

The following references are of record in the file of this patent:

UNITED STATES PATENTS

| Number | Name | Date |
|---|---|---|
| 1,172,648 | Vorraber | Feb. 22, 1916 |
| 1,888,351 | Robinson | Nov. 22, 1932 |
| 2,298,463 | Burt | Oct. 13, 1942 |

FOREIGN PATENTS

| Number | Country | Date |
|---|---|---|
| 340,228 | France | June 9, 1904 |
| 780,937 | France | May 6, 1935 |